(12) United States Patent
Lehmann et al.

(10) Patent No.: US 8,870,460 B2
(45) Date of Patent: Oct. 28, 2014

(54) PLAIN BEARING HALF LINER

(75) Inventors: Uwe Lehmann, Alzey (DE); Thomas Grooteboer, Essenheim (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 0 days.

(21) Appl. No.: 14/004,519

(22) PCT Filed: Feb. 3, 2012

(86) PCT No.: PCT/EP2012/051876
§ 371 (c)(1),
(2), (4) Date: Sep. 11, 2013

(87) PCT Pub. No.: WO2012/123186
PCT Pub. Date: Sep. 20, 2012

(65) Prior Publication Data
US 2014/0003750 A1    Jan. 2, 2014

(30) Foreign Application Priority Data

Mar. 11, 2011    (DE) .......................... 10 2011 005 466

(51) Int. Cl.
*F16C 33/10*    (2006.01)
*F16C 9/02*    (2006.01)
*F16C 17/02*    (2006.01)

(52) U.S. Cl.
CPC ............... *F16C 9/02* (2013.01); *F16C 33/1065* (2013.01); *F16C 17/022* (2013.01)
USPC ............................ 384/286; 384/288; 384/291

(58) Field of Classification Search
CPC ................ F16C 3/14; F16C 9/02; F16C 9/04; F16C 33/10; F16C 33/1025; F16C 33/1045; F16C 33/1055
USPC .......................... 384/283, 286, 288, 291, 294
See application file for complete search history.

(56) References Cited

U.S. PATENT DOCUMENTS

| 5,000,584 A | 3/1991 | Simmons |
| 6,225,720 B1 | 5/2001 | Desta |
| 6,491,438 B1 | 12/2002 | Ono et al. |
| 2009/0226123 A1* | 9/2009 | Klein ............................ 384/276 |

FOREIGN PATENT DOCUMENTS

| DE | 7612759 U1 | 4/1976 |
| DE | 2617843 A1 | 10/1977 |
| DE | 102005011372 A1 | 10/2005 |
| DE | 102005009470 A1 | 12/2005 |
| DE | 102005030307 A1 | 12/2006 |

(Continued)

OTHER PUBLICATIONS

Dubbel, Taschenbuch fur den Maschinenbau (Pocket Book for the Mechanical Engineering),19th Edition, B49, Section 6.2.2; B50, Section 6.2.3; B48 Section 6.2.

*Primary Examiner* — Phillip A Johnson
(74) *Attorney, Agent, or Firm* — Robert L. Stearns; Dickinson Wright, PLLC

(57) ABSTRACT

The invention relates to a plain bearing half liner for a crankshaft main bearing (24), with a slot (10) which extends in the circumferential direction over an angle of 90 to 170°, is closed at both circumferential ends of the plain bearing half liner and passes radially through the plain bearing half liner, and with an otherwise oil-groove-free sliding surface (11) on the inside of said plain bearing half liner.

12 Claims, 5 Drawing Sheets

(56) References Cited

FOREIGN PATENT DOCUMENTS

Figure 1:
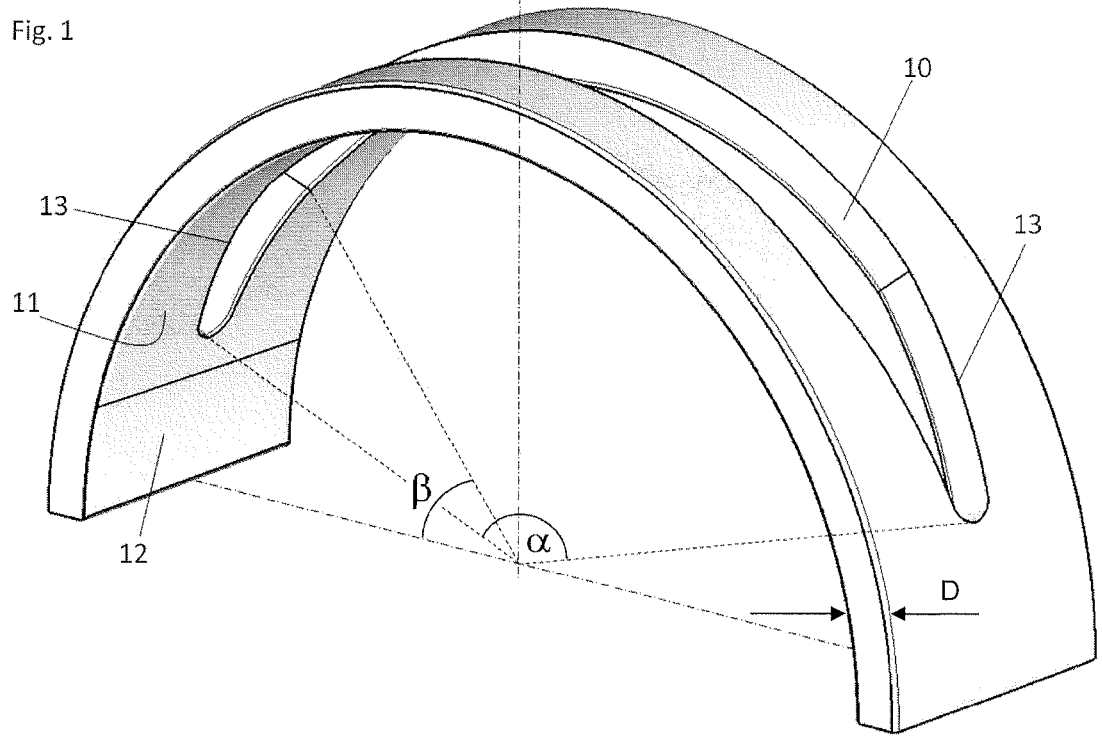

| | | |
|---|---|---|
| GB | 607400 A | 8/1948 |
| GB | 1193424 A | 6/1970 |
| JP | 63042842 U | 3/1988 |
| JP | 2001241442 A | 9/2001 |
| WO | WO-2005111445 A1 | 11/2005 |
| WO | WO-2007006291 A1 | 1/2007 |

* cited by examiner

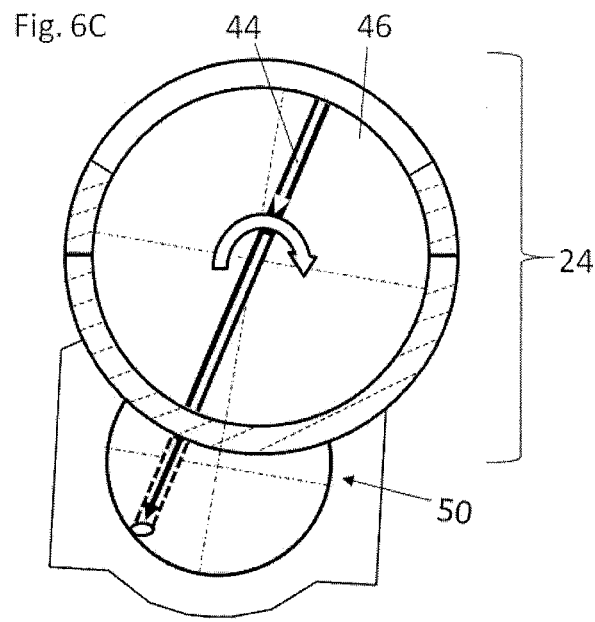
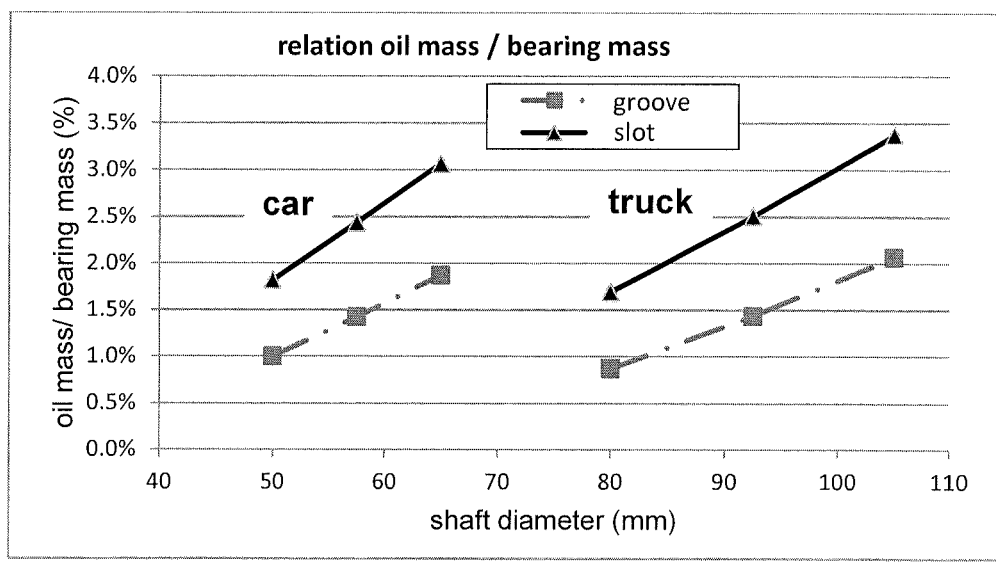

PLAIN BEARING HALF LINER

BACKGROUND OF THE INVENTION

1. Technical Field

This invention relates to a plain bearing shell for a main crankshaft bearing.

2. Related Art

Familiar plain bearing shells of this kind feature a radial oil bore and an oil groove communicating with the oil bore, running in circumferential direction and in axial direction usually arranged centrally in the sliding surface or race on the inside face of the plain bearing shell. The oil is delivered under pressure to the main crankshaft bearing, passing through it to the oil bore in the oil groove in which, on the one hand, it distributes lubrication and cooling to the main bearing and from which it also is directed to the conrod bearing through a connecting bore in the crankshaft. To compensate installation tolerances, and therefore to ensure that this aperture of the oil line in the engine housing aligns with the oil bore in the plain bearing shell, the oil bore is in quite a few cases embodied as a slot.

The main crankshaft bearing comprises two semi-cylindrical plain bearing shells of which usually only the upper one features an oil groove of this kind. Both plain bearing shells have what are referred to as exposed surfaces at each of their circumferential ends. These are areas on the inside surface before the circumferential ends of both plain bearing shells, in which the plain surface is slightly recessed radially, helping to compensate for any inaccuracy in radial fit between two radial bearings combined to form a plain bearing shell. This radial expansion can however give rise to an increased level of lateral (axial) oil flow from the main bearing. This is undesirable because it reduces oil pressure and increases the need for oil, and this needs to be compensated by larger oil pumps.

Reference is always made to the bearing geometry with the stipulations of 'in circumferential direction', 'axial' and 'radial.

To prevent this, in the more recent bearing shells of this type, the oil grooves frequently end in circumferential direction before the exposed surfaces. In this design, the oil grooves are machined into the plain bearing shell, usually with a milling operation, in such a way that their maximum depth is attained down their vertex, and usually extend continuously right to the ends in circumferential direction. Machining is generally performed on the shaped bearing shell.

Other known measures that counteract the axial outflow of oil may for example include an attempt to reduce bearing clearance, replacement of the exposed surfaces with deeper machining grooves or the vulcanization or insertion of elastomer rings to seal the bearing at its outer axial circumference. From a wide range of publications with this content, reference is made by way of example to DE 10 2005 009 470 A1, U.S. Pat. No. 6,491,438 B1 or DE 10 2005 011 372 A1. All named measures are fundamentally suitable for reducing the required volume of oil. All of these measures, including the partial grooves that terminate before the end point do however require more mechanical machining, which increases production costs.

SUMMARY OF THE INVENTION

The task of this invention is to provide a plain bearing shell for a main crankshaft bearing that assures a good supply of oil to the main crankshaft bearing and to the conrod bearing, causing as little lateral outflow of oil as possible, while also being cost-effective to manufacture.

The plain bearing shell for a main crankshaft bearing that is depicted in this invention has a radial slot and an otherwise oil groove-free plain surface on its inside face extending in circumferential direction through an angle of 90° to 170° that is closed at both circumferential ends and that passes through the plain bearing shell in a radial manner.

The slot is sealed at both circumferential ends of the plain bearing shell, i.e. such that it does not extend to either side into the subarea of the plain bearing shell, minimizing any accidental oil outflow across those sub-surface areas.

The advantages of this solution are numerous. Manufacturing is simplified because the slot can for example, when the strip is being stamped, be incorporated in a single operation or when the bearing shell is being reshaped in a secondary tool linked in a transfer line without the need to alter settings on the work piece clamping fixture. This eliminates the need for a separate machining operation and this saves time and money.

Due to the fact that the slot extends radially across the entire bearing shell, compared to a groove of identical width and length, it provides a greater volume for an oil reservoir. In particular, this larger oil volume benefits the start-stop applications of modern engines for the automotive industry. It is kept ready at precisely the location where it is needed, so that when the engine starts, until a sufficient level of oil pressure builds up, no time is lost, and a large volume of oil is available to lubricate the bearing. That makes the solution presented in this invention particularly beneficial because the larger oil volume is not achieved at the expense of the load-bearing characteristics of the plain bearing shell.

Also during operation, this slot also delivers benefits because, compared to a groove of identical width, it provides a larger volume of oil as well as a larger cross-section which enhances the flow rate. This means that the slot counters the oil with less hydrodynamic resistance than a comparable groove. This is important because the oil bore, in order to supply the conrod bearing in the crankshaft during operational use rotates relative to the main bearing, and a sufficient volumetric flow rate of oil therefore has to be assured at every point around the circumference of the slot and/or the oil groove. There is also less throttle action in the transition point between oil supply bore in bearing housing to the plain bearing shell. To this end, the larger radial dimension (and depth) compared to a (flat) oil groove makes a contribution because oil flowing from the aperture of the oil line emerges for the most part at a perpendicular angle to the bearing, meaning that it does collide immediately with the shaft and therefore does not require such a sharp angle of deflection in its direction of flow.

Finally, the plain bearing in this invention also makes it possible to achieve a weight saving. This constitutes a beneficial property in terms of its favourable impact on fuel economy.

In a preferred embodiment, the slot only extends in circumferential direction over an angle of 130° to 165°. In a particularly preferred embodiment, in a plain bearing shell comprising a clearance on the inside face before each of its circumferential ends, the slot ends in circumferential direction before both clearances.

This ensures that oil is distributed in circumferential direction across the largest possible angular range virtually unhindered without being able to flow directly into the exposed surface area before the circumferential ends of the bearing shell. On the one hand, this assures adequate lubrication and cooling to the main bearing and an unhindered oil flow across a large angular range through the connecting bore in the crankshaft that leads to the conrod bearing. On the other hand, oil losses are minimized by axial oil outflow, meaning that oil flow rate and therefore also the oil pump can be dimensioned in a way that they deliver only the actual quantity of oil required for lubrication and cooling purposes.

It is beneficial for the slot to narrow gradually, i.e. to taper, in an axial direction towards its two circumferential ends.

This tapering (conical area) has technical benefits in respect of shaping and is the preferred option if the slot is already present before the plate section is reshaped to form the semi-cylindrical bearing shell. This tapering evens out the change in strength in circumferential direction caused by the slot. That in turn delivers benefits if the bearing shell, in accordance with common practice, is manufactured from a flat plate unit using a shaping process. This is because the risk of accidental distortion caused by the weakening of bearing shell caused by the slot can be reduced. In addition, this tapering makes it possible to influence the volume of oil that flows into the oil bore on the crankshaft, causing this oil volume over time to gradually increase from the start of the overlap between oil bore and slot. This is often a benefit because any abrupt oil flow can cause cavitation or erosion damage in the plain bearings. The tapering can always be embodied in a linear form, in the form of a parabola or of another function, in a preferred but lasting manner.

A particularly preferred embodiment starts with the tapering in an area of 30° to 60° from the relevant circumferential end of the bearing shell.

Another preferred embodiment involves the rounding of the circumferential ends of the slot.

A round contour, e.g. with a radius extending across half the width of the slot immediately before the circumferential end of the groove, reduces tool wear on the stamping tool and also assures more uniform force distribution during the shaping process.

Alternatively or in addition it is beneficial for this slot to narrow increasingly in an axial direction as it converges on the vertex of the bearing shell.

Apart from any tapering at the ends of the slot, when viewed in circumferential direction, it initially manifests a wide area (flaring) in which a larger volume of oil is available, then tapering down towards a narrower area (choke point) that, while it does assure a sufficient level of oil flow, does not provide the same large volume of oil. If the aperture of the connecting bore in the crankshaft makes contact with the slot when it rotates, it is first connected to the larger oil reservoir inside the slot, meaning that sufficient oil can flow to the conrod bearing in a short period of time. Once the conrod bearing has been supplied with oil in this way, less oil is needed enroute to the vertex. The reservoir in the slot is then refilled.

In this way, the slot shape can generally be adapted to suit the oil requirements of the conrod bearing. It is therefore entirely possible for the slot length and/or the slot width characteristics to be designed asymmetrically in respect of the vertex of the bearing shell. Specific adaptation to suit the oil needs of the conrod bearing is performed in various ways, including by taking account of the position of the point where the connecting bores debouch into the crankshaft.

In a preferred embodiment, the slot occupies a surface area $F_S$ of the total sliding surface area $F_G$ of 12% to 28% and in a particularly preferred embodiment from 14% to 25%.

In this ratio, the ratio of oil supply to load-bearing surface of sliding area has proven to constitute an optimum.

In this embodiment of the invention, the slot is bridged by one or more webs, said webs cover a total proportion of surface area of $F_{St}$ that does not exceed 20% and, in a preferred embodiment, does not exceed over more than 10% of surface area component $F_S$ of the slot including the webs.

The 'web' comprises the section of bearing shell material that bridges the slot in a broadly axial direction and that, in a plan view of that slot, divides it into two halves. Even if the slot is divided into two or more sections by the webs, reference is made to just one slot. The angle that the slot spans in this invention is measured from the outer ends of the two external sections. The slot sections differ from an arrangement of two circumferential bores or slots, as known for example from publication U.S. Pat. No. 6,491,438 B1, primarily by the ratio between surface area component (or length) webs to surface area component (or length) of entire slot including webs. The proportion occupied by webs in the bearing shell disclosed in this invention is substantially less than all known bearing shells.

If the slot is incorporated in the bearing shell before the plate section is shaped, the strength of the decreasing slot width at the end area of the slot and the arrangement of one or more such webs increase the stability of the plain bearing shell and/or plate section, particularly while the plate section is being formed into the shape of a bearing shell. For this reason, webs should be arranged most especially at weak point and/or areas of particularly high load during the shaping process. The web or webs can therefore in many cases be removed again after the shaping process, which involves an additional operation.

The web or webs are arranged preferably in radial direction and should be flatter than the material thickness D (also thickness) of the plain bearing shell.

The web or webs extend(s) across less than the entire thickness of the plain bearing shell in such a way that the sections of the slot are connected in a groove-like manner before and after the web beside the web. This groove-type connection should explicitly not be excluded in terms of this invention from the phrase 'otherwise oil groove-free sliding surface' while the proportion of surface area $F_{St}$ of the web (and therefore the length of the groove-type connection) in the aforementioned and stipulated dimension is smaller than the proportion of surface area $F_S$ of the entire slot. Webs of this kind are manufactured preferably by having the height, and therefore radial extent, of webs remaining in place after stamping of the slot sections, reduced in an embossing or coining operation. In a preferred embodiment, the web or webs terminate on outside face located radially opposite to the sliding surface, flush with the back of the bearing on the plain bearing shell. The height of the web is preferably reduced to such an extent that the cross section surface area of the groove-like connection permits the volume of oil required by the bearing application.

The slot features a maximum width B, whereby the ratio of maximum width B to the thickness or material thickness D of the plain bearing shell is 1.5 to 3.5.

In this range, the flow rate characteristics of the oil are sufficiently favourable. As stated above, the cross section of flow rate and the oil volume of the slot, compared to a groove of the same width are both higher. If you wish to achieve the same cross section and the same volume in the groove, it would need to be widened. However, that would not reduce the flow rate resistance to the same extent as the increase in cross sectional surface area, which can be traced back to surface area-related factors. For this reason, as the inventors discovered, it is more favourable to increase the cross section of the oil line than it is to increase its depth, but there are limits governing by how far that width can be increased. This is due not least to the fact that, as groove/slot width increases, the load-bearing surface area of the bearing shell decreases proportionally. Due to the fact that material thickness D of the plain bearing shell and therefore also the depth of the slot are stipulated by their physical design, the maximum width of a preferred embodiment was found to be less than or equal to 3.5 times material thickness D and greater than or equal to 1.5 times material thickness D. In a particularly preferred embodiment, the width of the slot, even in tapered areas, is greater than material thickness D and/or the depth of the slot, and this prevents tapered areas of this nature from generating excessively high pressure losses in the oil line.

THE DRAWINGS

Figure 2:
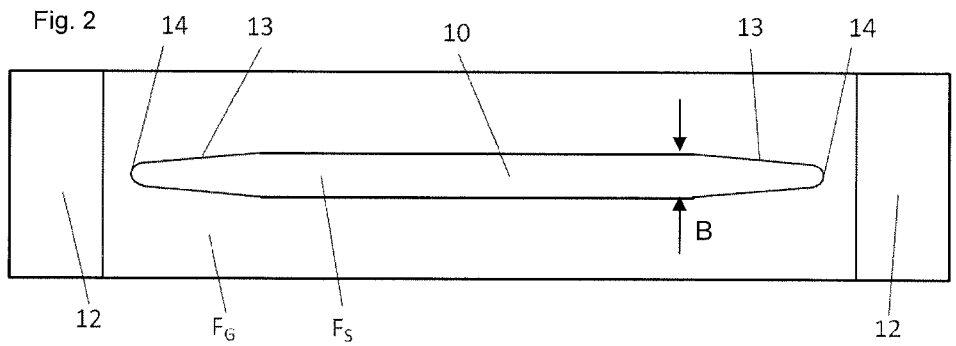
Figure 3:
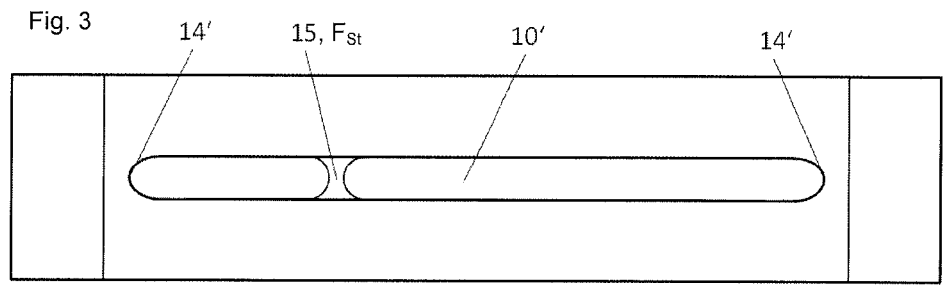
Figure 4:
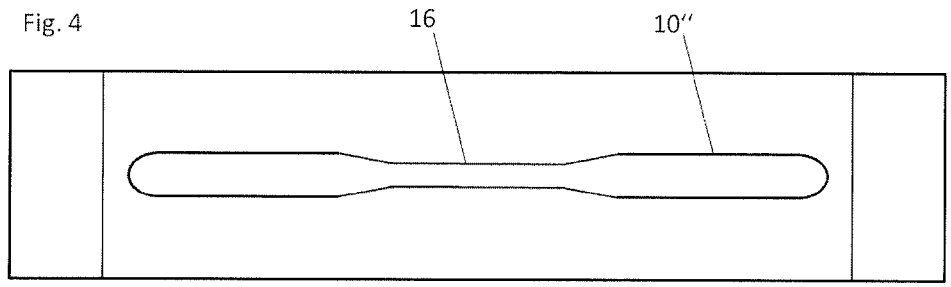
Figure 5:
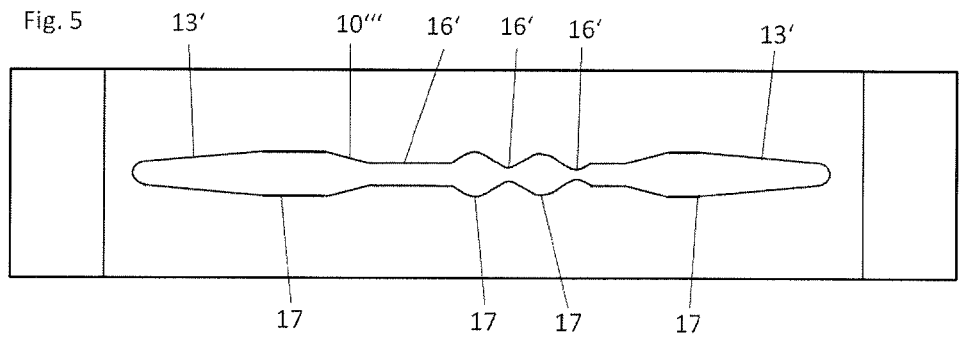
Figure 6A:
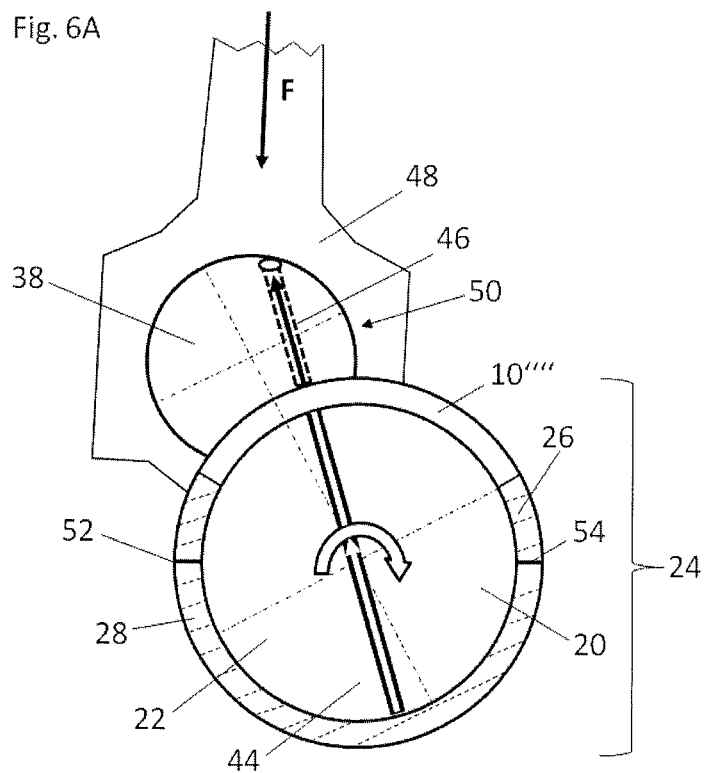
Figure 6B:
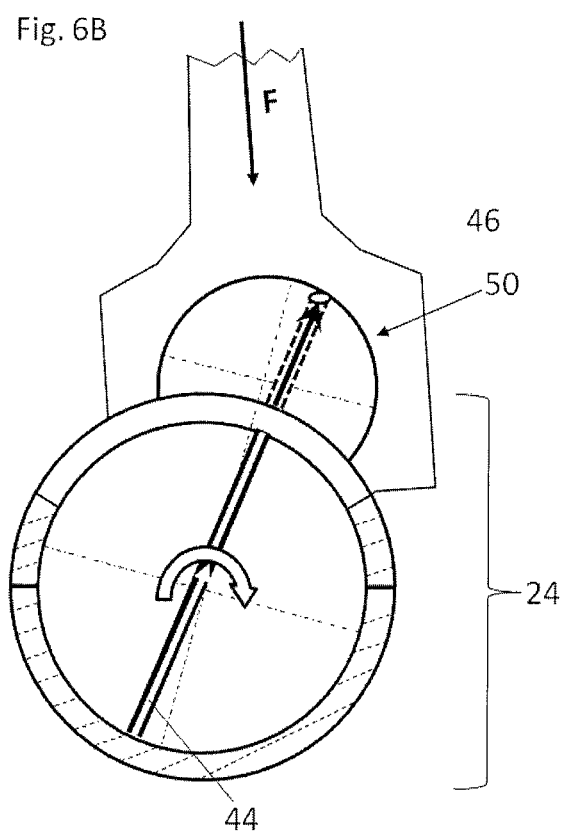
Figure 8:
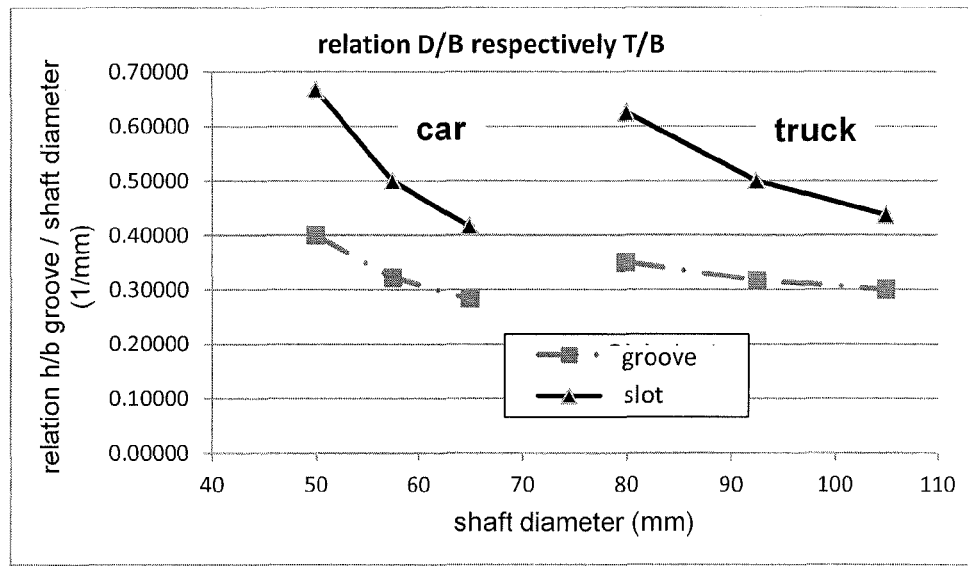
Figure 9:
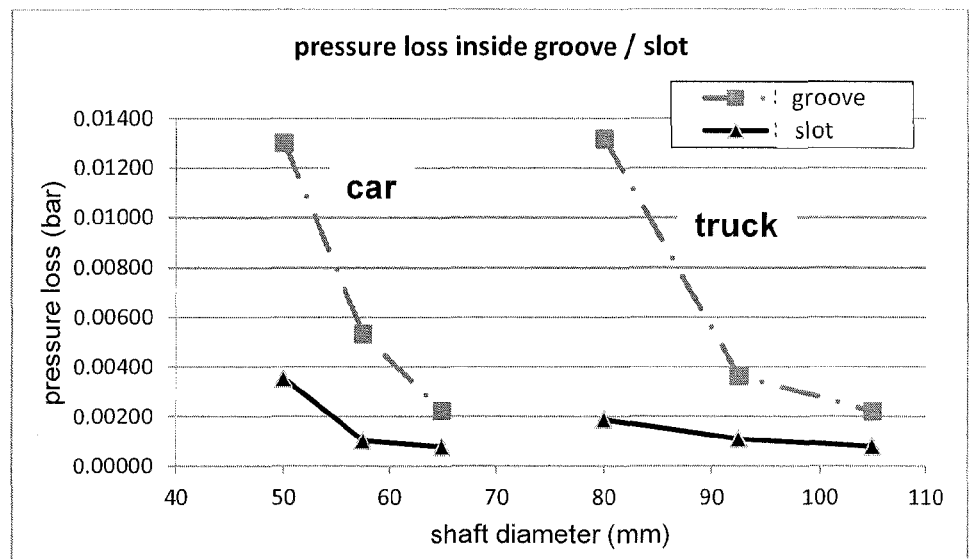

These and other advantages and features of the invention will now be explained in greater detail on the basis of implementation examples. Illustrated here:

FIG. 1 an implementation example of the plain bearing shell featured in this invention in a perspective view;

FIG. 2 a derivation of the plain bearing shell in acc. with FIG. 1 in the plan view;

FIG. 3 a derivation of a second implementation example of the plain bearing shell;

FIG. 4 a derivation of a third implementation example of the plain bearing shell;

FIG. 5 a derivation of a fourth implementation example of the plain bearing shell;

FIG. 6A to 6C illustrate radial sectional views of a crankshaft arrangement with the radial plain bearing featured in this invention in three positions;

FIG. 7 a diagram of the oil supply of the bearing featured in this invention compared to familiar grooved bearings;

FIG. 8 a diagram of the ratio of height to width of the slot on the bearing featured in this invention compared to the groove in familiar bearings and FIG. 9 a diagram of the pressure losses of the bearing featured in this invention compared to familiar grooved bearings.

DETAILED DESCRIPTION

FIGS. 1 and 2 illustrate an embodiment of the upper plain bearing shell of a main crankshaft bearing as featured in this invention with a slot 10 that extends in circumferential direction over an angle α, closed at both circumferential ends of the plain bearing shell and passing radially through the plain bearing shell. Angle α is preferably 90° to 170°, and a particularly preferred angle is 130° to 165°.

On its inside surface, the plain bearing shell has a sliding surface 11 that, during operation, is in contract with the mating rotor, i.e. with the stub end of a crankshaft. This sliding surface 11 is free of oil grooves, with the exception of slot 10. 'Oil groove-free' as defined in this publication is also used to refer to sliding surfaces that, for example, feature circumferential fine machining grooves arising from the machining step of drilling or boring that, at a microscopic level, can have an oil-conducting function, but are not specifically intended to distribute oil in a circumferential direction.

The plain bearing shell also has an exposed surface at each of its circumferential ends. It can be seen that slot 10 ends at both ends, viewed in a circumferential direction, before the exposed surfaces. In FIG. 2, this example is illustrated as an embodiment.

Slot 10 tapers in axial direction, running up to both circumferential ends 14. This causes tapered areas 13 to arise at both ends. These narrowing or 'tapered' areas 13 commence at a distance from the circumferential ends of the plain bearing shell quoted at an angle of β that preferably lies within a range of 30° to 60°. Furthermore, the slot is radiused at both of its circumferential ends. These two named measures have technical manufacturing benefits, as explained above.

Also shown in the illustration is a thickness or material thickness D of the plain bearing shell 10.

The embodiment shown in FIG. 3 also features a web 15 that, by way of example, is not arranged at the centre of the slot. This web does not extend across the entire thickness of the plain bearing shell (perpendicular to the illustration plane) but is instead reduced is cross section or more accurately in height after the slot 10' has been stamped out by means of a coining process.

Web 15 is then, in a preferred embodiment, arranged on the external side of the back of the bearing radially opposite the sliding surface. It serves to stabilize the plain bearing shell during the shaping process and/or while in operation. Depending on purpose, after shaping, it can be removed in a subsequent operation. However, for reasons of cost, it can be advantageous to leave it where it is. That presupposes that its height is reduced to a point where the cross section of the slot at this point facilitates the required rate of oil flow.

In the place of web 15, it is also possible to provide several spaced out webs that sub-divide the slot into three or more sections. The only important factor here is that the web or webs 15 must exhibit a proportion of surface area $F_{St}$ that does not exceed 20% and that preferably does not exceed 10% of the proportion of surface area $F_S$ of the slot, whereby proportion of surface area $F_S$ of slot 10 incorporates proportion of surface area $F_{St}$ or the webs.

This figure also illustrates width B of slot 10 measured at the widest point of the slot. This width should be selected on the basis of the aforementioned considerations within a defined ratio of thickness D of the plain bearing shell.

The example depicted in FIG. 4 features a slot 10'' that tapers progressively in axial direction towards the vertex of the plain bearing shell. At this point is a taper 16 of slot 10''', here at the area of the vertex. This tapering or narrowing 16 is preferably continuous, but can at one or more points be discontinuous. Furthermore, the taper is arranged symmetrically relative to the vertex of the plain bearing shell, but can also be arranged asymmetrically as shown in the further embodiment, illustrated in FIG. 5.

By way of example, here are four further slot sections or flared ends 17 and three interposed tapers 16'. Furthermore, slot 10''' in the area around its two circumferential ends features tapers or conical areas 13''. These flared ends 17 must in practice be arranged in such a way that an oil reservoir and/or an enlarged flow rate cross section can be provided where it is needed. This may be the case at several points around the circumference of the plain bearing shell, as the example in FIG. 5 is intended to illustrate.

These positions absolutely do not need to be distributed uniformly around the circumference or symmetrically with reference to the vertex. Preference should however be given to symmetrical distribution because this increases safety, making it impossible to install the bearing shell the wrong way around.

As already mentioned previously, it is not only preferable for the maximum width B to be less than or equal to 3.5 times the material thickness D and greater than or equal to 1.5 times the material thickness D, but also for the width of the slot in the tapered areas 16 or 16' to be greater than material thickness D and/or than the depth of the slot. This prevents excessively high pressure losses in the oil line.

FIGS. 6A to 6C describe how the plain bearing shell shown in this invention acts in a crankshaft arrangement. These Figures all show the same crankshaft arrangement in radial section views. To be more precise, in each case, a crankshaft 20 is illustrated in two superimposed radial sections, one cut at axial height of a shaft journal 22 on crankshaft 20 and one at the height of a lifting journal 38 on crankshaft 20. Accordingly, the foreground view shows the main crankshaft bearing 24 that encloses shaft journal 20 with, in the background, a large conrod lug 50 surrounding conrod 28 with lifting journal 38. FIGS. 6A to 6C illustrate crankshaft 20 in three different angle settings.

The main crankshaft bearing 24 also comprises 2 plain bearing shells, these being the upper plain bearing shell 26 defined in this invention and the lower plain bearing shell, the sub-surfaces 52, 54 of which make contact with one another. The lower plain bearing shell 28 is designed as a smooth bearing without groove and without slot. The upper plain bearing shell 26 defined in this invention features the slot 10'''' in circumferential direction.

Through the shaft journal 22, a connecting bore 44 runs radially, and this communicates with slot 10''''. This bore runs at an oblique angle to the presentation plane through a crank support on the crankshaft and continues through the lifting journal 38 in a bore section 46, providing a fluid connection between the main bearing 24 and the bearing on the large conrod eye 50 to supply the latter with oil. Of course, different bore arrangements are conceivable and indeed already known on the crankshaft. Depending on the location of the aperture, these can have an influence on the specific design of the slot in the plain bearing shell described in this invention.

The main crankshaft bearing 24 is in a fixed location, as shown in FIGS. 6A-6C and collector bore 44 turns clockwise when the crankshaft 20 rotates. This causes the aperture of connecting bore 44 to brush past the sliding surfaces of the upper and lower bearing shells. Whenever the aperture of connecting bore 44 fits into slot 10'''' in the upper bearing shell 26, the conrod bearing is connected to the oil volume flowing through the slot. If after half a complete turn of the crankshaft, the aperture of the connecting bore 44 slides overlaps with the smooth surface of the lower plain bearing shell 28, cf. FIGS. 6B and 6C, no oil flow is directed to the conrod bearing.

If as the example shown here, slot 10'''' extends across virtually the entire circumference of the upper plain bearing shell, an almost continuous flow of oil to the conrod bearing is assured across half of the cycle. An oil flow across almost the entire cycle could be achieved in a simple manner, involving connecting bore 44 having a second branch with a second aperture diametrically opposite to the first one in the sectional plane through the shaft journal, which would cause slot 10'''' to overlap with the first aperture with a phase shift of 180°.

Based on the diagrams in FIGS. 7 to 9 in conjunction with the following table, technical hydrodynamic benefits of the plain bearing with slot defined in this invention can be demonstrated in a comparison with a conventional plain bearing shell with groove (comparative plain bearing). The underlying assumption is that each Figure shows three main crankshaft bearings for a car engine and for a truck engine with typical dimensions. The shaft diameter refers to the bearing journal that is mounted in the main crankshaft bearing. The terms total wall thickness D, bearing width, bearing volume and sliding surface of bearing refer to the dimensions of the upper plain bearing shell. These details are identical for the plain bearing with slot described in this invention, and for the comparative plain bearing with groove.

Groove width and slot width B and their extension in circumferential direction are also based on the same underlying values, but in the case of the comparative plain bearing, a groove the depth of which reduces as it approaches either end is assumed for this purpose. A typical initial radius of 20 mm is assumed to exist in both instances. The maximum groove depth T between the two tapering end sections is quoted in each case. The slot depth in the plain bearing shell defined in this invention corresponds at all points to the respective total wall thickness D of the bearing shell.

Already when comparing the volumes, an advantage emerges for the plain bearing shell described in this invention. Depending upon size of bearing, it may provide between 1.6 times and twice the oil of the comparative bearing. The result for the bearing in this invention emerges even more favorably if you compare the masses of oil held in readiness as a ratio of the bearing mass for both bearing types, cf. also the diagram in FIG. 7. This quotient is particularly interesting because, as well as oil supply, modern engine manufacture places growing emphasis on the need to save weight.

In overall terms, in respect of sufficient oil supply, particularly in start-stop operations, it has proven to be beneficial for the proportion of surface area occupied by slot $F_S$ represents between 12% and 28% of the total surface area $F_O$, with a particular preference being for between 14% and 25%.

The hydraulic (substitute) diameter is a computed value that involves converting the assumed cross sectional surface area into a hydrodynamically equivalent circular surface area taking due account of the cross sectional form, cf. Dubbel, *Taschenbuch für den Maschinenbau* [Pocket Book for Mechanical Engineering], $19^{th}$ edition, B50, Section 6.2.3. This is where reference is made to this ratio of depth to width of slot and of groove respectively.

The oil flow rate is a typical value for prevailing application conditions for the bearings illustrated, and it used as a basis for the comparative bearing and for the bearing described in this invention, assuming identical bearing sizes in each case.

The speed of flow is derived from the oil flow rate quoted and from the cross sections involved. Here again, a substantial advantage emerged in favor of the plain bearing shell with slot described in this invention, for which the flow speeds were lower than those of the comparative bearing by a factor of 0.5 to 0.7.

This has a corresponding impact on the computed Reynolds coefficient and therefore on the flow rate condition, whereby in all other respects, the same parameters are applied. In the case of car bearings, these constituted an oil density of 0.7784 kg/liter and a dynamic oil viscosity of 4,484 e-09 Ns/mm$^2$ and with truck bearings an oil density of 0.7864 kg/liter and a dynamic oil viscosity of 6.25 e-09 Ns/mm$^2$. It is clear from this that even bearings with smaller dimensions than the bearing described in this invention develop laminar flow rate characteristics in the slot, whereas conventional bearings with a groove are still subject to turbulent flow conditions that in turn have an impact on the friction coefficient of the pipework, culminating in pressure loss in the oil line through the bearing shell. In such cases, where flow conditions are turbulent, a hydraulically smooth cross section is assumed to exist, cf. Dubbel, *Taschenbuch für den Maschinenbau* [Pocket Book for Mechanical Engineering], $19^{th}$ edition, B49, Section 6.2.2.

To calculate the friction coefficient in pipework, first establish the phi coefficient, cf. Dubbel, *Taschenbuch für den Maschinenbau* [Pocket Book for Mechanical Engineering], $19^{th}$ edition, B50, Section 6.2.3. First of all, this incorporates the ratio of width B to depth D of the slot and this, in accordance with this invention, should preferably embody a value of 1.5 to 3.5 and should be clearly distinguished from the ratio of depth T and width B of the groove in known grooved bearings. To illustrate this point, this ratio is illustrated in FIG.

8 for the bearing described in this invention, and is then compared to the ratio of known grooved bearings of identical dimension in each instance.

Based on the assumption of a laminar flow rate (Reynolds coefficient<2300) and turbulent flow conditions (Reynolds coefficient>2300), pressure losses from pipework friction dp can then the computed using equation 11a from Dubbel, *Taschenbuch für den Maschinenbau* [Pocket Book for Mechanical Engineering], $19^{th}$ edition, B48, Section 6.2. The pressure losses in the oil line through the groove of the plain bearing shell described in this invention ranges, depending on bearing dimension, from a preferable embodiment of less than 3.55 mbar to, in the case of medium-sized bearings (shaft diameter greater than 55 mm) preferably even less than 2 mbar, as illustrated in FIG. 9. In any event, the pressure losses resulting from the design of bearing shell described in this invention, when compared to the familiar grooved bearing and assuming identical bearing dimensions and identical operating parameters for large bearings can be reduced by 2.5 times and, in the case of medium-sized to small bearings, can even be reduced by up to 7 times the level, as shown in the figures on the table. This is due in particular to the improvement of ratio between depth D and width B of the slot in comparison to the depth-to-width ratio T/B of the groove.

| | | CARS | | | TRUCKS | | |
|---|---|---|---|---|---|---|---|
| | | Minimum | Medium | Maximum | Minimum | Medium | Maximum |
| Main Crankshaft Bearing Typical Dimensions | | | | | | | |
| Shaft Diameter | mm | 50 | 57.5 | 65 | 80 | 92.5 | 105 |
| Total Wall Thickness D | mm | 2 | 2.25 | 2.5 | 2.5 | 3 | 3.5 |
| Bearing Width | mm | 14 | 19 | 24 | 20 | 25 | 30 |
| Bearing Volume | $mm^3$ | 2243 | 3937 | 6244 | 6381 | 11074 | 17607 |
| Bearing Gliding Surface Area | $mm^2$ | 1122 | 1750 | 2498 | 2553 | 3691 | 5030 |
| Cooperative Bearing with Tapered Groove Typical Dimensions | | | | | | | |
| Groove Extent in circumferential Direction | ° | 130 | 150 | 170 | 130 | 150 | 170 |
| Groove Depth T | mm | 1.2 | 1.45 | 1.7 | 1.4 | 1.9 | 2.4 |
| Groove Depth B | mm | 3 | 4.5 | 6 | 4 | 6 | 8 |
| Groove Volume with Initial Radius = 20 mm | $mm^3$ | 170 | 418 | 856 | 448 | 1231 | 2707 |
| Hydraulic Diameter (dH) | mm | 1.71429 | 2.19328 | 2.64935 | 2.07407 | 2.88608 | 3.69231 |
| Oil Flow Rate | L/min | 2.34 | 2.58 | 3.02 | 3.06 | 3.87 | 4.95 |
| Flow Rate Speed | mm/s | 10833.33 | 6590.04 | 4934.64 | 9107.14 | 5657.89 | 4296.88 |
| Reynolds Coefficient | — | 3223.91 | 2509.10 | 2269.51 | 2376.68 | 2054.59 | 1996.25 |
| Flow Rate Condition | — | Turbulent | Turbulent | Laminar | Turbulent | Laminar | Laminar |
| Ratio T/B of Groove | — | 0.4000 | 0.32222 | 0.28333 | 0.35000 | 0.31667 | 0.30000 |
| Coefficient (phi) | — | 1.02559 | 1.08252 | 1.11656 | 1.06055 | 1.08714 | 1.10149 |
| Pipework friction coefficient (lambda) | — | 0.04199 | 0.04471 | 0.03149 | 0.04532 | 0.03386 | 0.03531 |
| Pressure Losses from Pipe Friction dp | bar | 0.01300 | 0.00532 | 0.00223 | 0.01316 | 0.00365 | 0.00221 |
| Mass of Bearing (mL) | kg | 0.01631 | 0.02754 | 0.04202 | 0.04680 | 0.07726 | 0.11646 |
| Mass of Oil in the Groove (mO) | Kg | 0.00016 | 0.00039 | 0.00079 | 0.0041 | 0.00111 | 0.00241 |
| Mass of oil/mass of bearing (mL) | — | 1.0% | 1.4% | 1.9% | 0.9% | 1.4% | 2.1% |
| Bearing with Slot Described in this Invention | | | | | | | |
| Extent of slot in circumferential direction | ° | 130 | 150 | 170 | 130 | 150 | 170 |
| Slot with B | mm | 3 | 4.5 | 6 | 4 | 6 | 8 |
| Slot Volume | $mm^3$ | 347 | 777 | 1474 | 922 | 2215 | 4434 |
| Hydraulic Diameter (dH) | mm | 2.40000 | 3.00000 | 3.52941 | 3.07692 | 4.00000 | 4.86957 |
| Oil Throughput | L/min | 2.34 | 2.58 | 3.02 | 3.06 | 3.87 | 4.95 |
| Flow Speed | mm/s | 6500.00 | 4246.91 | 3355.56 | 5100.00 | 3583.33 | 2946.43 |
| Reynolds Coefficient | | 2708.08 | 2211.73 | 2055.91 | 1974.47 | 1803.48 | 1805.30 |
| Flow Rate Conditions | | Turbulent | Laminar | Laminar | Laminar | Laminar | Laminar |
| Ratio D/B of Slot | | 0.66667 | 0.50000 | 0.41667 | 0.62500 | 0.50000 | 0.43750 |
| Coefficient (phi) | | 0.91847 | 0.97153 | 1.01518 | 0.92822 | 0.97153 | 1.00299 |
| Pipework Friction Coefficient (lamda) | | 0.04386 | 0.02811 | 0.03160 | 0.03009 | 0.03448 | 0.03556 |
| Pressure loss from Pipework friction (dp) | Bar | 0.00355 | 0.00103 | 0.00079 | 0.00187 | 0.00109 | 0.00080 |
| Mass of Bearing (mL) | Kg | 0.01518 | 0.02528 | 0.03815 | 0.04352 | 0.07066 | 0.10510 |
| Mass of Oil in Groove (mO) | Kg | 0.00028 | 0.00062 | 0.00117 | 0.00074 | 0.00177 | 0.00354 |

| | CARS | | | TRUCKS | | |
|---|---|---|---|---|---|---|
| | Minimum | Medium | Maximum | Minimum | Medium | Maximum |
| Mass of Oil/Mass of Bearing | 1.8% | 2.4% | 3.1% | 1.7% | 2.5% | 3.4% |

The invention claimed is:

1. A plain bearing shell for a main crankshaft bearing with, the plain bearing shell defining a circumferential direction, a radial direction and an axial direction and having two opposite circumferential ends and a slot arranged in the circumferential direction extending over an angle of 90 to 170°, the slot being closed at both circumferential ends of the plain bearing shell and intersecting the plain bearing shell in a radial direction with an otherwise oil groove-free plain surface on the inside face, wherein the slot tapers towards at least one of its two circumferential ends in the form of a conical area and towards the vertex of the plain bearing shell in the axial direction.

2. The plain bearing shell according to claim 1, wherein the slot extends in the circumferential direction over an angle of 130 to 165°.

3. The plain bearing shell according to claim 1 with an exposed surface on the inside face at each of its circumferential ends, wherein the slot ends in the circumferential direction before both exposed surface areas.

4. The plain bearing shell in accordance with claim 1, wherein the taper begins in a range of 30° to 60° before the circumferential end of the plain bearing shell.

5. The plain bearing shell in accordance with claim 1, wherein the slot is rounded at both of its circumferential ends.

6. The plain bearing shell in accordance with claim 1, wherein the slot occupies a proportion of surface area $F_S$ of the total plain area $F_G$ between 12% and 28%.

7. The plain bearing shell in accordance with claim 1, wherein the slot is bridged by one or more webs, whereby the webs occupy a total proportion of surface area $F_{St}$ that does not exceed 20% of the surface area $F_S$ of the slot including the webs.

8. The plain bearing shell in accordance with claim 7, wherein the webs are flatter in radial direction than the material thickness of the plain bearing shell.

9. The plain bearing shell in accordance with claim 1, wherein the slot has a maximum width B and in that the ratio of maximum width B to thickness D of the plain bearing shell is 1.5 to 3.5.

10. The plain bearing shell in accordance with claim 1, wherein the slot occupies a proportion of surface area $F_S$ of the total plain area $F_G$ between 14% and 25%.

11. The plain bearing shell in accordance with claim 1, wherein the slot is bridged by one or more webs, whereby the webs occupy a total proportion of surface area $F_{St}$ that does not exceed 10% of the surface area $F_S$ of the slot including the webs.

12. A plain bearing shell for a main crankshaft bearing, the plain bearing shell defining a circumferential direction, a radial direction and an axial direction and having two opposite circumferential ends and a slot arranged in the circumferential direction extending over an angle of 90 to 170°, the slot being closed at both circumferential ends of the plain bearing shell and intersecting the plain bearing shell in the radial direction with an otherwise oil groove-free plain surface on the inside face, wherein the slot tapers towards the vertex of the plain bearing shell in the axial direction.

\* \* \* \* \*